Sept. 10, 1940.  T. L. FAWICK  2,214,164
POWER TRANSMISSION
Filed Feb. 23, 1938  4 Sheets-Sheet 1
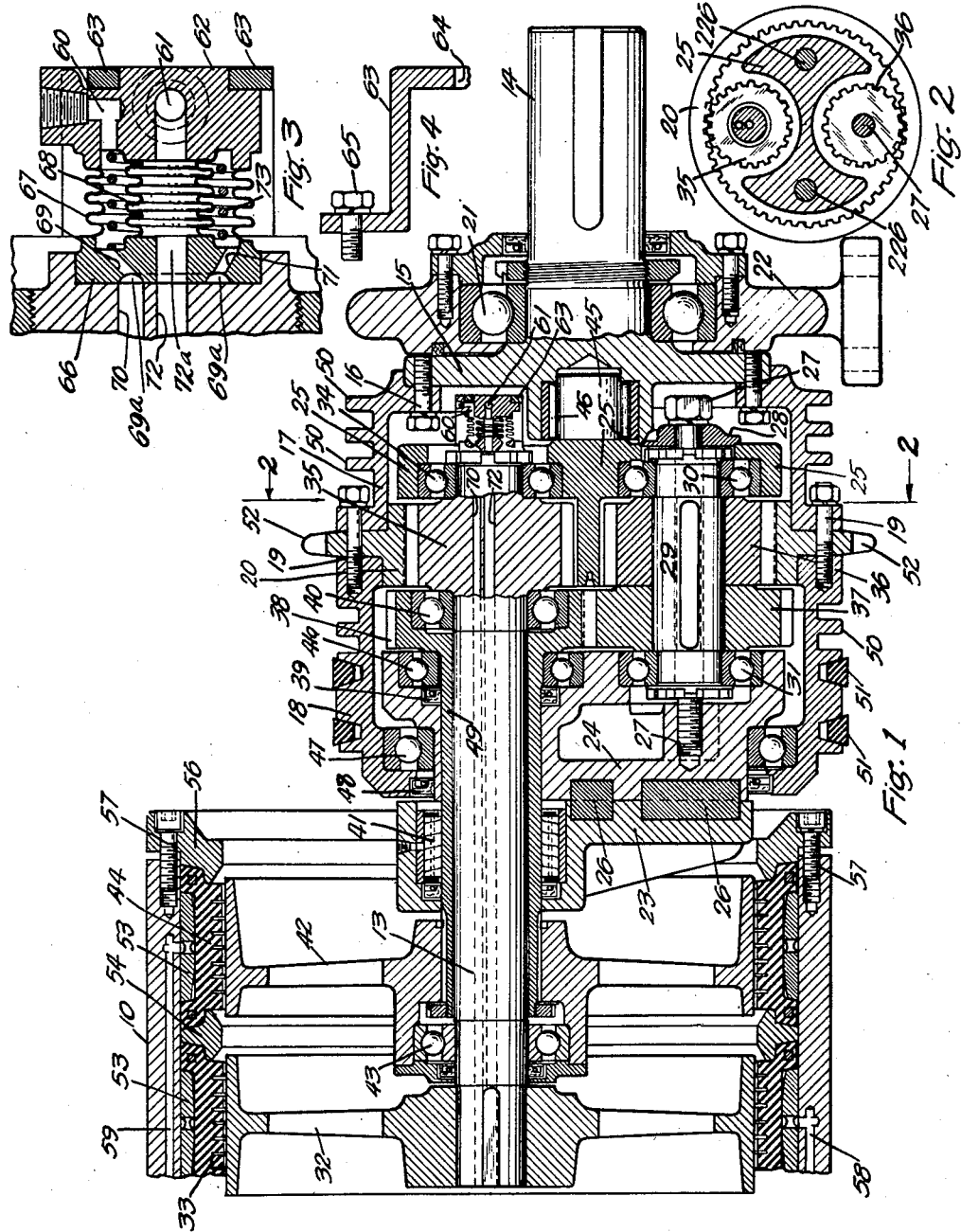
Thomas L. Fawick INVENTOR.
BY Willard D. Eakin
ATTORNEY.

Sept. 10, 1940.  T. L. FAWICK  2,214,164
POWER TRANSMISSION
Filed Feb. 23, 1938  4 Sheets-Sheet 2
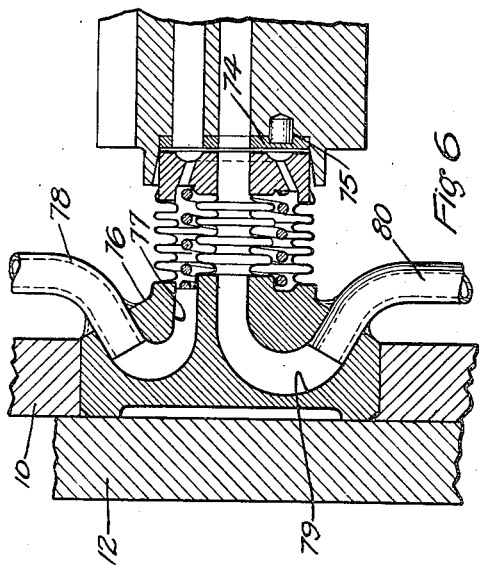
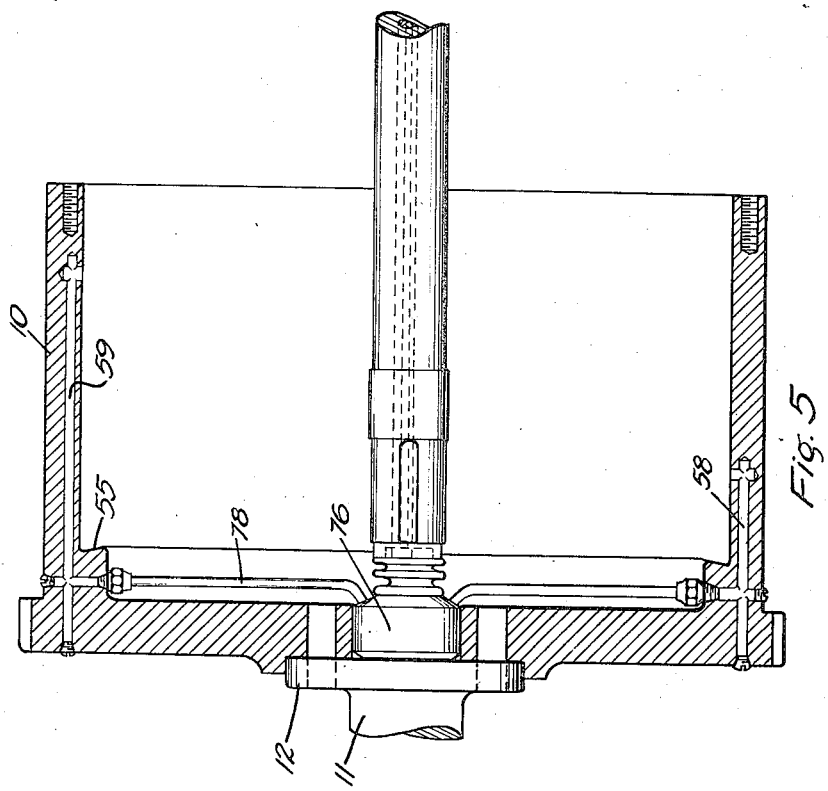
Thomas L. Fawick  INVENTOR
BY Willard D. Eakin
ATTORNEY Sept. 10, 1940.  T. L. FAWICK  2,214,164
POWER TRANSMISSION
Filed Feb. 23, 1938  4 Sheets-Sheet 3
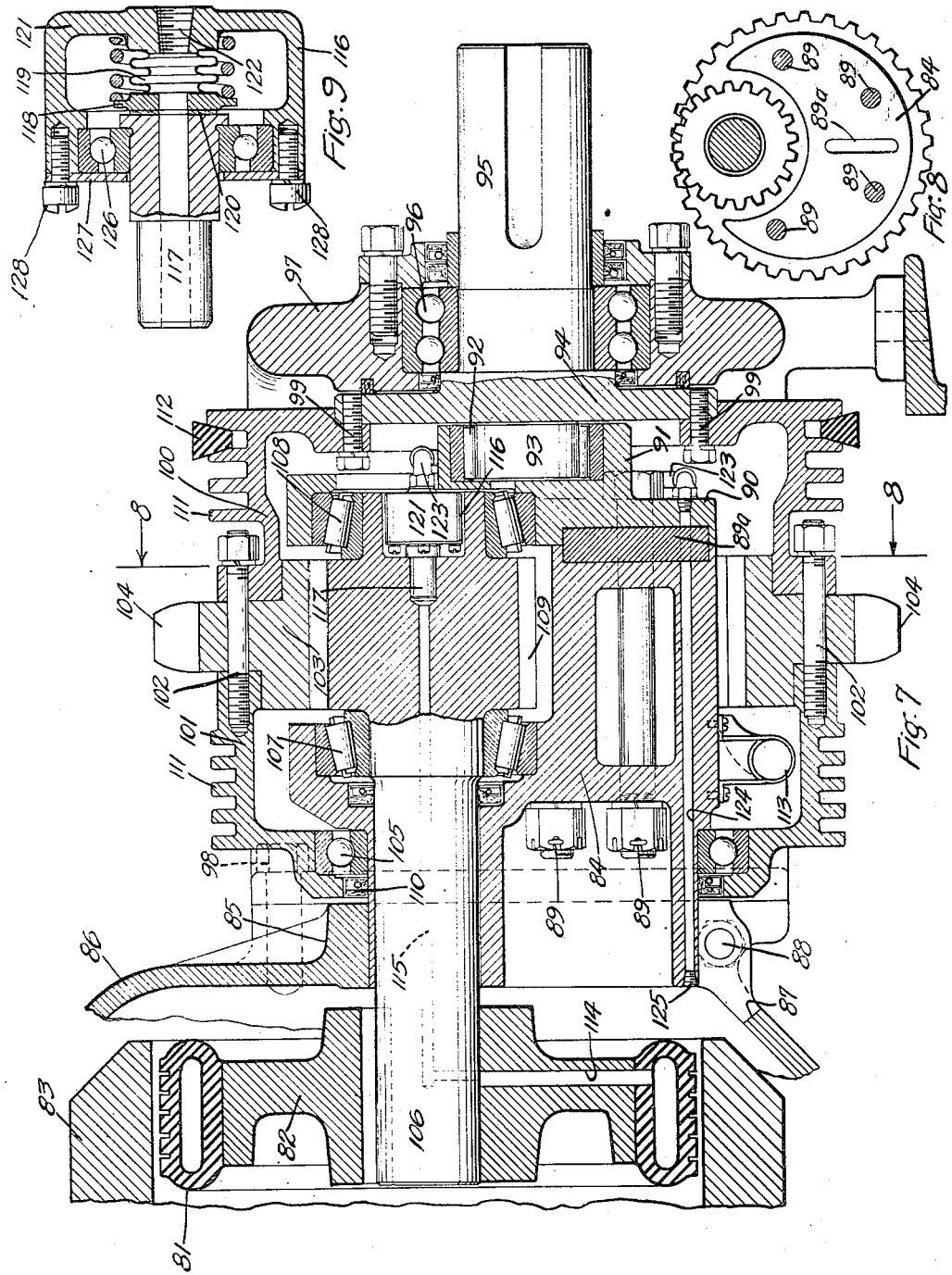
Thomas L. Fawick INVENTOR
BY Willard D. Eakin
ATTORNEY Patented Sept. 10, 1940

2,214,164

UNITED STATES PATENT OFFICE 2,214,164

POWER TRANSMISSION

Thomas L. Fawick, Akron, Ohio

Application February 23, 1938, Serial No. 192,084

13 Claims. (Cl. 74—389)

This invention relates to power transmissions.

Its chief objects are high efficiency of power transmission; quietness of operation; economy of manufacture and of operation; effective application of lubricating oil; effective cooling of the oil; compactness of structure; strength and durability; desirable cushioning of torque transmission; simple provision for reversal of drive; and adaptability for delivering the power to different types of driven members.

Of the accompanying drawings:

Fig. 1 is a vertical longitudinal section of a power transmission embodying my invention in one of its preferred forms.

Fig. 2 is a vertical transverse section of certain of the parts, on line 2—2 of Fig. 1.

Fig. 3 is a vertical longitudinal section, on a larger scale, of a fluid sealing and conducting means shown in Fig. 1.

Fig. 4 is a fragmentary horizontal section of a bracket, shown also in Figs. 1 and 3, for supporting the fluid sealing and conducting means of Fig. 3.

Fig. 5 is an extension of the structure of the left hand end of Fig. 1.

Fig. 6 is a vertical longitudinal section, on a larger scale, of parts that are shown in elevation in Fig. 5.

Fig. 7 is a vertical longitudinal section of a modified type of power transmission embodying some of the features of my invention.

Fig. 8 is a vertical transverse section of certain of the parts, on line 8—8 of Fig. 7.

Fig. 9 is a vertical longitudinal section, on a larger scale, of a fluid sealing and conducting device shown in elevation in Fig. 7.

Figure 10:
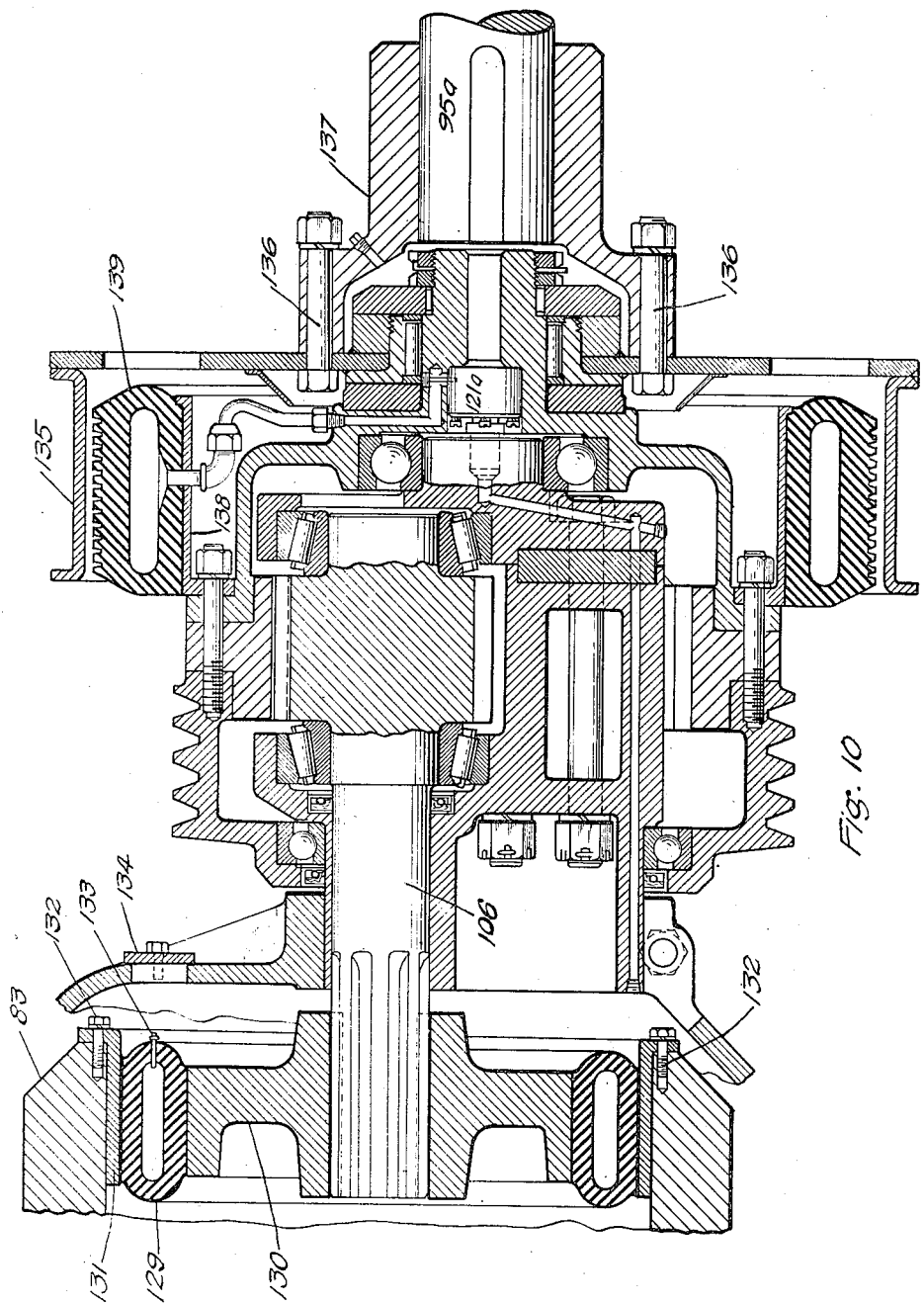
Fig. 10 is a vertical longitudinal section of another modification.

Referring to the drawings, the embodiment of the invention which is shown in Figs. 1 to 6 comprises a bell-shaped fly-wheel 10 of a motor, secured upon the motor shaft 11 (Figs. 5 and 6) having a head 12; a transmission shaft 13 extending into and driven, in forward drive, from the fly-wheel 10; a driven shaft 14 (Fig. 1) having a head 15 to which is secured by bolts 16, 16 a pair of rotating housing members 17, 18 having clamped between them, by means of bolts 19, 19, an internally toothed ring gear 20; a bearing 21, mounted in a supporting standard 22, for the driven shaft 14; a stationary internal supporting frame extending into the bell-like rotating housing that is provided by the members 17 and 18 and the ring gear 20 clamped between them, the said internal supporting frame comprising member 23, 24 and 25; and gearing journaled in part on the internal supporting frame and adapted to drive the shaft 14 in forward and reverse drive and with determinate speed ratios.

The stationary member 23 of the internal supporting frame includes a floor standard portion or a bracket portion secured to the motor housing (not shown) and the adjacent stationary member 24 is bolted to it and accurately positioned on it by means of keys 26, 26 (Fig. 1). The member 24 is formed at its other end with a web portion (obscured by the gearing) having an end face corresponding to and abutting against an end face of the next stationary member 25 (Figs. 1 and 2), the member 25 being secured to the member 24 by bolts 226, 226 and 27, the bolt 27 being provided with a bridge washer 28 engaging an aperture-defining annular margin of the member 25 and the bolt 27 extending to the member 24 through a bushing or sleeve 29 which is journaled in the member 25 by means of a bearing 30 and in the member 24 by means of a bearing 31.

For one direction of drive the transmission shaft 13 has secured on its end portion that is within the bell-shaped by-wheel 10 a clutch member 32 adapted to be engaged by a clutch member 33 secured on the inner face of the bell portion of the fly-wheel and there shown as an inwardly distensible annular diaphragm, the other end portion of the shaft 13 being journaled in the member 25 by means of a bearing 34 and having secured thereon a pinion 35 which is permanently meshed with the internal teeth of the ring gear 20.

For the opposite direction of drive there is secured upon the journaled bushing or sleeve 29 a pair of twin pinions 36, 37, the pinion 36 being of smaller diameter than the pinion 37; the pinion 36 being permanently meshed with the internal teeth of the ring gear 20; and the pinion 37 being permanently meshed with a pinion 38 which is formed on a sleeve or quill 39 journaled on the transmission shaft 13 by means of a bearing 40 and in the stationary internal-frame member 23 by means of bearings 41 and 41ª.

Secured upon an end portion of the quill 39 which extends into the bell portion of the fly-wheel 10 is a clutch member 42 having a hub portion journaled upon the shaft 13 by means of a bearing 43, and the clutch member 42 is adapted to be engaged by a clutch member 44 secured on the inner face of the bell portion of the fly-wheel and here shown as an inwardly distensible annular diaphragm.

For accurately maintaining alignment of and stabilizing the members of the structure the member 25 of the internal stationary frame structure is formed with a trunnion-like stem 45 extending into a bearing 46 which is mounted in a central recess formed in the head 15 of the shaft 14, so that this end of the internal frame structure has an aligning and stabilizing support from the large bearing 21 of the driven shaft 14, and a large-diameter bearing 47 and oil seal 48 are interposed between the open end of the bell-like rotary housing member 18 and the stationary internal frame member 24. An oil seal 49 also is provided between the stationary member 24 and the quill 39, so that a large quantity of oil can be employed in the rotating bell-like structure without escape of oil at this upper part of the assembly when the oil is carried up to it by centrifugal force in the operation of the mechanism.

The members 17 and 18 of the bell preferably are externally formed with cooling ribs 50, 50, and may be formed also with suitable grooves for one or more side-driving belts 51, 51, to provide single-belt or multiple-belt drive for an adjacent mechanism, and for like purpose the ring gear member 20 is shown as being externally formed with sprocket teeth 52, 52 for reception of a sprocket chain.

The inwardly distensible diaphragms 33 and 44, preferably having substantially the construction of a pneumatic tire but of small radial depth, preferably are mounted as shown, with a bead-spacing filler ring 53 in each and a spacer and clamping ring 54 between them, this assembly being clamped against an annular shoulder 55 (Fig. 5) formed in the base of the bell portion of the fly-wheel 10, by means of a clamping ring 56 (Fig. 1) adapted to be drawn toward the open end of the bell by means of bolts 57, 57.

For inwardly distending the diaphragm members 33 and 44 selectively, for forward and reverse drive respectively, the bell portion of the fly-wheel 10 is formed with fluid-conducting passages 58, 59 (Fig. 5) which are individual to the diaphragm members 33 and 43 and through intermediate connections are in communication with respective supply passages 60, 61 (Figs. 1 and 3) formed in the end member 62 of the fluid-sealing and conducting device which is shown most clearly in Fig. 3, and are adapted to have selective connection to a source of pressure fluid and also, if desired, to a suction line.

The device of Fig. 3 is non-rotatably supported by a U-shaped bracket 63 formed with a hole 64 (Fig. 4) for the reception of a boss formed on the member 62,—the bracket being secured by means of bolts such as the bolt 65 (Fig. 4) to the member 25 of the non-rotating internal frame structure.

The end member 62 of the device of Fig. 3 is connected to an opposite end member 66 by a bellows-like metal member 67 and a second bellows-like metal member 68 within the member 67. The fluid inlet passage 60 communicates with the annular space between the two bellows-like members and the said space through apertures 69 and 71 and an annular distributor channel 69ª formed in the end member 66, communicates with a fluid passage 70 extending lengthwise through the shaft 13. The fluid inlet passage 61 communicates with the space within the inner bellows-like member and that space, through an aperture 72ª formed in the end member 66, communicates with a fluid passage 72 which extends lengthwise through the shaft 13. The end member 66 is fitted in a round central recess formed in the end of the shaft 13 and the floor of the recess and the adjacent face of the member 66 are smoothly finished, and the member 66 can be made of a relatively soft material such as bronze, for an effective fluid seal between the said member and the shaft although there is relative rotation between the two. To provide sealing pressure additional to that afforded by the fluid pressure within the bellows-like members a helical compression spring 73, of such length when unstrained that it is under compression in the assembly, may be interposed, preferably in the annular space, between the two end members 62, 66.

At the other end of the shaft 13 is provided a fluid sealing and conducting device which is substantially like that of Fig. 3 as just described except that it is in reverse position and a fiber washer or sealing gasket 74 is mounted in the recess and secured against rotation by means of a dowel 75 and the recess in the end of the shaft is tapered so that in the assembling of the parts the end plate of the bellows will find its own way in to seal against the washer.

The end member 76 of this device is mounted in a recess formed in the hub portion of the fly-wheel, to rotate with the fly-wheel. The annular space between the two bellows-like members communicates, through an aperture 77 in the end member and through a pipe 78, with the passage 59 in the bell portion of the fly-wheel which leads to the diaphragm member 43; and the space within the inner bellows-like member leads, through an aperture 79 in the end member and through a pipe 80, with the fluid passage 58 in the bell portion of the fly-wheel which leads to the diaphragm member 33.

In the operation of this embodiment shown in Figs. 1 to 6, for forward drive, assuming both diaphragm members to be undistended and consequently out of contact with their mating inner clutch members, pressure fluid is let into the diaphragm member 33 to distend it inwardly and cause it to frictionally engage and drive its mating inner clutch member 32, and the bell-like housing 17, 20, 18 and the shaft 14 are thus driven, through the shaft 13, the pinion 35 thereon and the ring gear 20.

All of the gearing being constantly in mesh, this causes the inner clutch member 42 to rotate in a direction opposite to that of its mating diaphragm member 43, with which it is not in contact.

For reversal of drive the pressure fluid is exhausted from the forward-drive diaphragm member 33 and pressure fluid is let into the reverse-drive diaphragm member 43, to distend it inwardly and cause it to frictionally engage and drive its mating inner clutch member 42, and the reverse drive is through the quill 39, pinion 38, twin pinions 37, 36 and ring gear 20.

Advantages of this embodiment shown in Figs. 1 to 6 are that reversal of drive is effected without meshing or unmeshing of gears; the reversal is effected with smooth engagement of friction-clutch members and, when the elastic, fluid-distended diaphragm type of clutch is employed, as here shown, there is a further desirable cushioning of the torque and compensation for shaft misalignment, by reason of the elasticity of the fluid-distensible members; different speed ratios, for either direction of drive, can readily be provided by substitution of parts; the diaphragm members being on the outer member and distended inwardly for the driving engagement assures that they will be quickly and completely disengaged upon being deflated, whether suction is applied to the spaces within them or not, as the centrifugal force of their constant rotation is added to their own elastic recoil for disengaging them; their shallow radial depth and the presence of the filler members 53 within them make it necessary to supply only a small amount of fluid for distending them and requires the venting of a correspondingly small amount for quickly disengaging them; alignment and stability of the gearing is effectively maintained by reason of widely-spaced pairs of bearings throughout, the open end of the rotating bell housing being strongly supported on the large diameter bearing 47 and the internal frame structure being supported and stabilized by the bearing 46; the large diameter of the rotating bell housing and the extensive surface of the fins 50 provide effective cooling of the oil; and the sprocket and belt drives are provided without substantial additional cost.

Although the twin pinions 36 and 37 are of different diameters, the speed ratio in this embodiment of Figs. 1 to 6 is the same in forward and reverse drive, because the pinions 38 and 37 are of the same size and the pinions 35 and 36 are of the same size. However, a different ratio for reverse drive can be had, without changing the location of any of the centers of rotation, by substituting pinions 37 and 38 of different relative diameters.

The embodiment illustrated in Figs. 7 to 9 is adapted for one direction of drive only and comprises a single outwardly distensible bag 81 mounted upon an inner clutch member 82 and adapted, upon being distended, to engage and be frictionally driven by the inner face of a bell portion of a motor fly-wheel 83.

The internal frame structure in this embodiment comprises a member 84 formed with a large-diameter supporting stem which fits within an annular boss 85 formed on a portion of the motor housing 86, the boss being slotted as shown at 87 and drawn up in clamping relation to the stem of the internal frame member 84 by means of a clamping bolt 88. Secured to the internal frame member 84 by means of bolts 89, 89 and a key 89ª is another internal frame member 90 which is formed with a recessed annular boss or projection 91 in which is journaled, by means of a bearing 92, a trunnion-like projection 93 extending from the head 94 of the driven shaft 95, for supporting and steadying that end of the internal frame structure, the driven shaft 95 being journaled, by means of a large bearing 96, in a strong standard 97 which extends past the gearing on at least one side of the latter and is rigidly secured to the housing 86 of the motor by means of bolts such as the bolt 98, this arrangement providing a strong and well-stabilized inner and outer frame structure.

Secured to the head 94 of the driven shaft 95 by means of bolts 99, 99 is a bell-like rotary housing structure comprising members 100 and 101 clamping between them, under the force of bolts 102, 102, an internally toothed ring gear 103 which may be externally formed with sprocket teeth 104, 104. For stability the outer or open-end member 101 of the bell structure is journaled, by means of a large-diameter bearing 105, upon the internal frame member 84.

The inner clutch member 82 is secured upon a shaft 106 which, by means of a pair of spaced-apart radial and thrust bearings 107, 108, is journaled in the internal frame structure and this shaft 106 is formed with a driivng pinion 109 which is meshed with the internal teeth of the ring gear 103.

An oil seal 110 is interposed between the member 101 of the rotating housing and the internal frame member 84 so that the housing can contain a small or large amount of oil without leakage, the other end of the bell structure being completely closed. This bell structure can be formed with large diameter external cooling fins 111, 111 for effective cooling of the oil, which is held out in proximity to them throughout the circle of the structure by centrifugal force. Side faces of cooling fins of the set can be formed with oblique faces for reception of one or more side-driving belts such as the belt 112.

For assuring a generous supply of oil to the teeth of the gears 103 and 109, whether a large or a small supply of oil is present, the stationary internal frame member 84 may have secured thereon, preferably at a low position, an oil-diverting horn 113 adapted to catch oil that is rotating with the bell structure and divert it upward and laterally onto the teeth of the rotating ring gear 103.

For charging and venting the distensible bag 81 the bag is in communication, through a fluid passage 114 formed in the clutch member 83 and a fluid passage 115 formed in the shaft 106, with a fluid-sealing and conducting device 116 which comprises an axially apertured plug member 117 press-fitted into a countersink in the end of the shaft 106 and formed with a sealing outer end face adapted to seal against an end member 118 (Fig. 9) of a bellows-like metal member 119, with or without the interposition of a sealing washer or gasket 120.

The other end of the bellows-like metal member 119 is secured and sealed to a cup-shaped member 121 with its interior in communication with a taper-threaded aperture 122 formed in the cup-shaped member and communicating through a pipe 123 (Fig. 7) with a fluid passage 124 formed in the internal frame members 90 and 84 and terminating in a taper-threaded mouth 125, opposite the slot 87 in the motor-housing boss 85, for connection with valve-controlled piping (not shown) leading from a pressure line and from a suction line, the application of suction to the interior of the bag 81 in this embodiment being desirable for overcoming centrifugal force for quickly and completely disengaging the bag from the inner face of the fly-wheel 83.

The cup-shaped member 121 is at least partially supported and is held against rotation by the pipe 123 and it is permissibly partially supported and is steadied by a bearing 126 interposed between it and the rotary plug member 117. The races of this bearing are shown as being held in place by an annular closure plate 127 secured to the annular edge face of the cup-shaped member 116 by screws 128, 128.

In view of the foregoing description the mode of operation and the advantages of this embodiment will be manifest without further comment.

The embodiment shown in Fig. 10 corresponds to that of Fig. 7 except that a flexible coupling is interposed between the motor fly-wheel 83 and the gearing and a clutch mechanism is interposed between the gearing and the driven shaft.

The flexible coupling comprises a bag 129, preferably having substantially the construction of a pneumatic tire but for flexibility having only radially disposed reinforcing cords, as described and claimed in my copending applications Serial Nos. 99,420 and 99,421, filed September 4, 1936.

This bag preferably is vulcanized at its inner periphery to an inner member 130 and at its outer periphery to a stamped metal ring 131 of L-shaped cross-section adapted to be secured to the fly-wheel 83 by cap-screws 132, 132. The bag is provided with an inflating stem 133 accessible through a hole in the motor casing which is provided with a cover plate 134.

Preferably the inner clutch member 130 is slip-splined on the transmission shaft 106, for easy assembly of the transmission with the motor after the flexible coupling has been mounted in the fly-wheel.

The clutch structure between the gearing and the driven shaft, 95ᵃ, comprises a bell-like outer clutch structure 135 secured by bolts 136, 136 to a hub 137 keyed on the shaft; an inner clutch member 138 mounted directly upon the bell-shaped rotary gear housing; and a fluid-expansible bag 139 fixedly mounted, as by vulcanization, upon the inner clutch member 13 and adapted to be distended into engagement with the outer clutch structure 135, substantially as described in my copending applications Serial No. 99,420, filed September 4, 1936, Serial No. 101,638, filed September 19, 1936, and Serial No. 131,656, filed March 18, 1937.

A fluid-sealing and conducting device 121ᵃ corresponding substantially to the device 116 of Fig. 7 is provided for charging and venting the bag 139 during its rotation.

I claim:

1. A power transmission comprising a drive shaft and a driven shaft in series, a bell-shaped structure having drive relation to one of said shafts and surrounding a portion of the other shaft, a stationary structure extending into and providing a journal mounting for the bell-shaped structure at positions near the latter's respective ends, and drive means interposed operatively between the bell-shaped structure and the shaft portion that it surrounds.

2. A power transmission comprising a drive shaft and a driven shaft in series, a bell-shaped structure having drive relation to one of said shafts and surrounding a portion of the other shaft and journaled at a position near its bell-mouth end, drive means interposed operatively between the bell-shaped structure and the shaft portion that it surrounds, the bell-shaped structure being internally so shaped as to provide a trough-like annular space for positive retention of oil therein, and a stationary member positioned within but supported from the exterior of the bell-shaped structure and adapted to divert oil contained in said space and rotating with the bell-shaped structure.

3. A power transmission comprising a drive shaft and a driven shaft in series, a bell-shaped structure having drive relation to one of said shafts, a stationary structure extending into the bell-mouth end of the said structure and having journaled relation thereto near the latter's other end, and gearing journaled on the stationary structure, within the bell-shaped structure and providing drive connection between the bell-shaped structure and the other of the two shafts.

4. A power transmission comprising an internally toothed gear ring, a stationary bearing-support having a part surrounded by said gear ring and providing axially spaced-apart bearings for same, a shaft extending into said gear ring and journaled on said bearing support, and a gear on said shaft meshed with the internal teeth of said gear ring.

5. A power transmission comprising a drive shaft and a driven shaft in series, a bell-shaped structure, including an internal gear ring, having concentric drive relation to one of said shafts and eccentrically surrounding a portion of the other shaft, a bearing for said structure near its bell-mouth end, a quill surrounding the eccentric shaft and extending into the bell-shaped structure, gearing wholly within the bell-shaped structure and connecting it to the shaft within it, and gearing wholly within the bell-shaped structure and connecting it to the quill, and, extending into the bell-shaped structure, a stationary bearing support for said gearing.

6. A power transmission comprising a drive shaft and a driven shaft in series, a bell-shaped structure, including an internal gear ring, having concentric drive relation to one of said shafts and eccentrically surrounding a portion of the other shaft, a bearing for said structure near its bell-mouth end, gearing wholly within the bell-shaped structure and connecting it to the shaft that it surrounds, a stationary bearing support, extending into the bell-shaped structure, for said gearing, and flexible-coupling means surrounding the bell-shaped structure and providing the said drive relation.

7. A power transmission comprising a drive shaft and a driven shaft in series, a bell-shaped structure, including an internal gear ring, having concentric drive relation to one of said shafts and eccentrically surrounding a portion of the other shaft, a bearing for said structure near its bell-mouth end, gearing wholly within the bell-shaped structure and connecting it to the shaft that it surrounds, a stationary bearing support, extending into the bell-shaped structure, for said gearing, and flexible-coupling clutch means surrounding the bell-shaped structure and providing the said drive relation.

8. A power transmission comprising a drive shaft and a driven shaft in series, a bell-shaped structure, including an internal gear ring, having concentric drive relation to one of said shafts and eccentrically surrounding a portion of the other shaft, a bearing for said structure near its bell-mouth end, gearing wholly within the bell-shaped structure and connecting it to the shaft that it surrounds, a stationary bearing support, extending into the bell-shaped structure, for said gearing, flexible-coupling means surrounding the bell-shaped structure and providing the said drive relation, and flexible coupling means associated with the surrounded shaft.

9. A power transmission comprising a drive shaft and a driven shaft in series, a bell-shaped structure, including an internal gear ring, having concentric drive relation to one of said shafts and eccentrically surrounding a portion of the other shaft, a bearing for said structure near its bell-mouth end, gearing wholly within the bell-shaped structure and connecting it to the shaft that it surrounds, and a stationary bearing support, extending into the bell-shaped structure, for said gearing.

10. A power transmission comprising a drive shaft and a driven shaft in series, a bell-shaped structure, including an internal gear ring, having concentric drive relation to one of said shafts and eccentrically surrounding a portion of the other shaft, a bearing for said structure near its bell-mouth end, a gearing wholly within the bell-shaped structure and connecting it to the shaft that it surrounds, and a stationary bearing support, extending into the bell-shaped structure, for said gearing, said bell-shaped structure being internally formed with an oil-retaining annular trough and being externally exposed and substantially unobstructed.

11. A power transmission comprising a drive shaft and a driven shaft in series, a bell-shaped structure, including an internal gear ring, having concentric drive relation to one of said shafts and eccentrically surrounding a portion of the other shaft, a bearing for said structure near its bell-mouth end, gearing wholly within the bell-shaped structure and connecting it to the shaft that it surrounds, and means on the outer face of said bell-shaped structure for engaging another member in drive relation thereto.

12. A power transmission comprising a drive shaft and a driven shaft in series, a bell-shaped structure mounted in extension of and having drive relation to one of said shafts, a stationary structure extending into the bell-mouth end of the said structure and providing internal bearing therefor, and internal gearing connecting the bell-shaped structure with the other shaft, the said bearing being more remote from said bell-mouth end than is said internal gearing.

13. A power transmission comprising a drive shaft and a driven shaft in series, a bell-shaped structure having drive relation to one of said shafts, a stationary structure extending into the bell-mouth end of the said structure and providing internal bearing therefor, and internal gearing connecting the bell-shaped structure with the other shaft, the said bearing being more remote from said bell-mouth end than is said internal gearing.

THOMAS L. FAWICK.